(12) United States Patent
Yaguchi (10) Patent No.: US 6,491,389 B2
(45) Date of Patent: Dec. 10, 2002

(54) SPECTACLE FRAME WITH ADJUSTABLE EAR BENDS

(75) Inventor: Kenichi Yaguchi, Chiba-ken (JP)

(73) Assignees: Nikon Eyewear Co., Ltd., Tokyo (JP); Nikon Corporation, Tokyo (JP)

( * ) Notice: Subject to any disclaimer, the term of this patent is extended or adjusted under 35 U.S.C. 154(b) by 0 days.

(21) Appl. No.: 09/897,384

(22) Filed: Jul. 3, 2001

(65) Prior Publication Data

US 2002/0003604 A1 Jan. 10, 2002

(30) Foreign Application Priority Data

Jul. 5, 2000 (JP) .................................. 2000-203017

(51) Int. Cl.[7] .............................................. G02B 5/14
(52) U.S. Cl. ...................................... 351/123; 351/118
(58) Field of Search ............................... 351/123, 118, 351/119, 113, 121

(56) References Cited

U.S. PATENT DOCUMENTS

| 509,967 A | 12/1893 | Sumner | 351/123 |
|---|---|---|---|
| 2,172,959 A | 9/1939 | Hirtenstein | 2/13 |
| 4,652,098 A | 3/1987 | Anger | 351/123 |
| 4,712,893 A | 12/1987 | Anger | 351/123 |
| 4,755,042 A | 7/1988 | Anger | 351/123 |
| 4,790,645 A | 12/1988 | Gish | 351/119 |
| 4,848,891 A | 7/1989 | Lee | 351/113 |
| 4,925,291 A | 5/1990 | Anger et al. | 351/123 |
| 5,623,322 A | 4/1997 | Hirschman et al. | 351/119 |

FOREIGN PATENT DOCUMENTS

| GB | 423641 | 2/1935 |
|---|---|---|
| JP | 7-181434 | 7/1995 |
| JP | 8-304744 | 11/1996 |
| JP | 3040039 | 5/1997 |

Primary Examiner—Huy Mai
(74) Attorney, Agent, or Firm—Miles & Stockbridge P.C.

(57) ABSTRACT

A spectacle frame with ear bends each comprising an auricular front member connected to a temple, an auricular back member contactable with the back of the ear, and a connecting member for connecting the front member and the back member to be rotatable. The spectacle frame further comprises selective pressing means capable of changing a first state in which the back member presses the back of the ear with a second state in which the back member does not press the back of the ear.

23 Claims, 12 Drawing Sheets

(2ND STATE)

FIG. 7

(UNSTABLE STATE)

FIG. 8

(1ST STATE)

(UNSTABLE STATE)

FIG. 14

(1ST STATE)

(1ST STATE)

SPECTACLE FRAME WITH ADJUSTABLE EAR BENDS

This application claims the benefit of Japanese Patent application No. 2000-203017 which is hereby incorporated by reference.

BACKGROUND OF THE INVENTION

1. Field of the Invention

The present invention relates to an improvement in a spectacle frame which is provided with an ear bend.

2. Related Background Art

Figure 17:
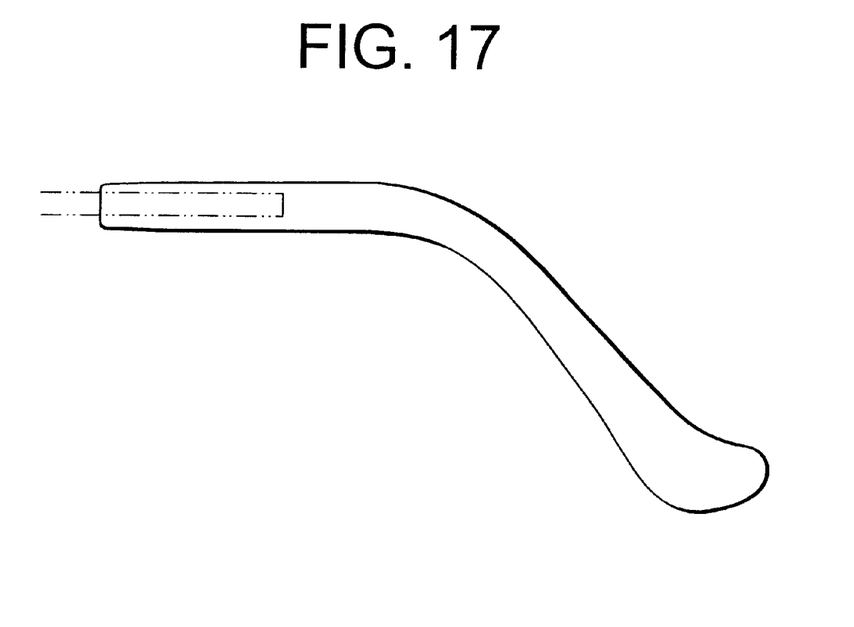
FIG. 17 is a side view for showing a conventional ear bend of a skull temple type.

An ear bend (drop end) is a kind of an auricular side (temporal side) part of a spectacle frame, and requires a comfortable touch when the spectacles are worn by the wearer as a part in direct contact with the wearer's body. Generally, an ear bend in the form of a skull temple is used (FIG. 17). Ear bends are formed of plastics and, in case of an ear bend of the skull temple type, the spectacle frame is easily put on or off so that the wearer can obtain a conformable touch in the worn state for a long time.

However, a spectacle frame with the skull-temple type ear bends has a drawback that it is liable to slip off or slip down in a vigorous sport or vibration or owing to perspiration.

Figure 18:
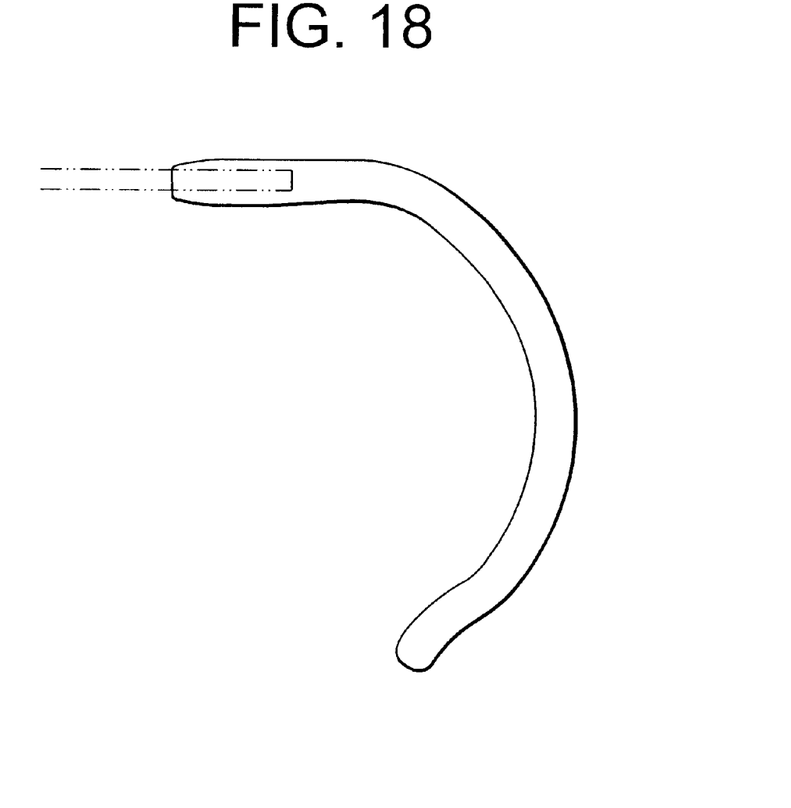
FIG. 18 is a side view for showing another conventional ear bend of a winding cable type.

In order to prevent such slip of the spectacle frame, the ear bends have been subjected to various improvements. For instance, there is an ear bend called a winding cable type which has the form close to a semi circle, as shown in FIG. 18. With the winding cable type ear bends, though the spectacle frame is difficult to slip off, compared with that having the skull-temple type ear bends, more trouble and time are required to put on and off the spectacle frame. Moreover, due to larger areas on the ear bends in contact with the wearer's skin (back sides of the ears), the wearer is liable to feel a pain for a long time use.

Also, there is proposed an arrangement of a spectacle frame with a springing force in the ear bend portion, as disclosed in the Japanese Patent Application Laid-Open No. 7-181434, or a spectacle frame in an arrangement capable of adjusting a relative position between the temple and the ear bend, as disclosed in the Utility Model Publication No. 3040039.

Furthermore, according to the Japanese Patent Application Laid-Open No. 8-304744, there is proposed a spectacle frame which can stabilize the ear bends by pressing them all the time against the back sides of the ears by means of a magnetic force or a spring force.

However, these conventional spectacle frames can only attain either one of the advantages (1) to prevent a slip off or down of a spectacle frame caused by a sport, vibration or perspiration, and (2) to easily put on or off the spectacle frame and to obtain a conformable worn state for a long time. However these both advantages can not be achieved at the same time.

SUMMARY OF THE INVENTION

An object of the present invention is to provide a spectacle frame which can satisfy both of the above advantages (1) and (2) at the same time.

According to a first aspect of the present invention, there is provided a spectacle frame with the ear bends each comprising an auricular front member connected to the temple, an auricular back member connectable with the wearer from the back of the ear, and a connecting member for connecting the front member and the back member to be rotatable, further comprising pressing means capable of selectively changing (1) a first state in which the back member presses the back of the ear, with (2) a second state in which the back member does not press the back of the ear.

In the first state, since the back member presses the ear, the spectacle frame hardly slips off and is stable even in vigorous activities such as a sport. The first state is replaced with the second state with one touch, and since the back member does not press the ear in the second state, the spectacle frame can be easily put off.

According to a second aspect of the present invention, in the spectacle frame according to the first aspect, an elongated hole is formed on the front member on the side connected to the back member, the elongated hole includes a spring therein, a ball is placed on the back end of the spring, and the ball is biased backward by the spring. On the other hand, a cam approximately having the shape of an isosceles triangle is provided in front of the back member, and the cam is to be brought into contact with the ball so that the ball presses the cam. However, since the cam approximately has the shape of an isosceles triangle, and the ball is brought into contact with either one of the two oblique sides of the isosceles triangle, whereby the contacted oblique side is pressed, the back member is resultantly rotated in the direction A for coming closer to the back of the ear or in the direction B for going far from the back of the ear by using the connecting member as the center of rotation. When the back member is rotated in the direction A, the back member comes in the first state for pressing the back of the ear. On the other hand, when the back member is rotated in the direction B, the back member comes in the second state for not pressing the back of the ear. As a result, it is possible to selectively realize the first state or the second state easily by pressing the back member either in the direction A or the direction B.

According to a third aspect of the present invention, there is provided the spectacle frame according to either one of the first aspect and the second aspect, which is characterized in that the front member comprises an adjustment mechanism for adjusting a position for connection between the temple and the front member on the side connected to the temple, so that the length from the front end of the temple to the back end of the front member is adjustable.

BRIEF DESCRIPTION OF THE DRAWINGS

FIGS. 4A and 4B are views for showing a front member according to the first embodiment, in which

FIGS. 5A and 5B are views for showing a back member according to the first embodiment, in which

FIGS. 10A and 10B are views for showing a front member according to a second embodiment of the present invention, in which

FIGS. 11A and 11B are views for showing an ear bend according to the second embodiment, in which

DETAILED DESCRIPTION OF THE PREFERRED EMBODIMENTS

According to the present invention, there is provided an ear bend which is composed of a front member to be mounted on the ear of a wearer and a back member positioned at the back of the ear, for which a first state in that the ear bend is contacted only with the top of the ear, as an ear bend of the skull temple type, and a second state in that the ear bend is mounted on the ear to press the back of the ear can be easily replaced with each other with one touch if needed.

Figure 1:
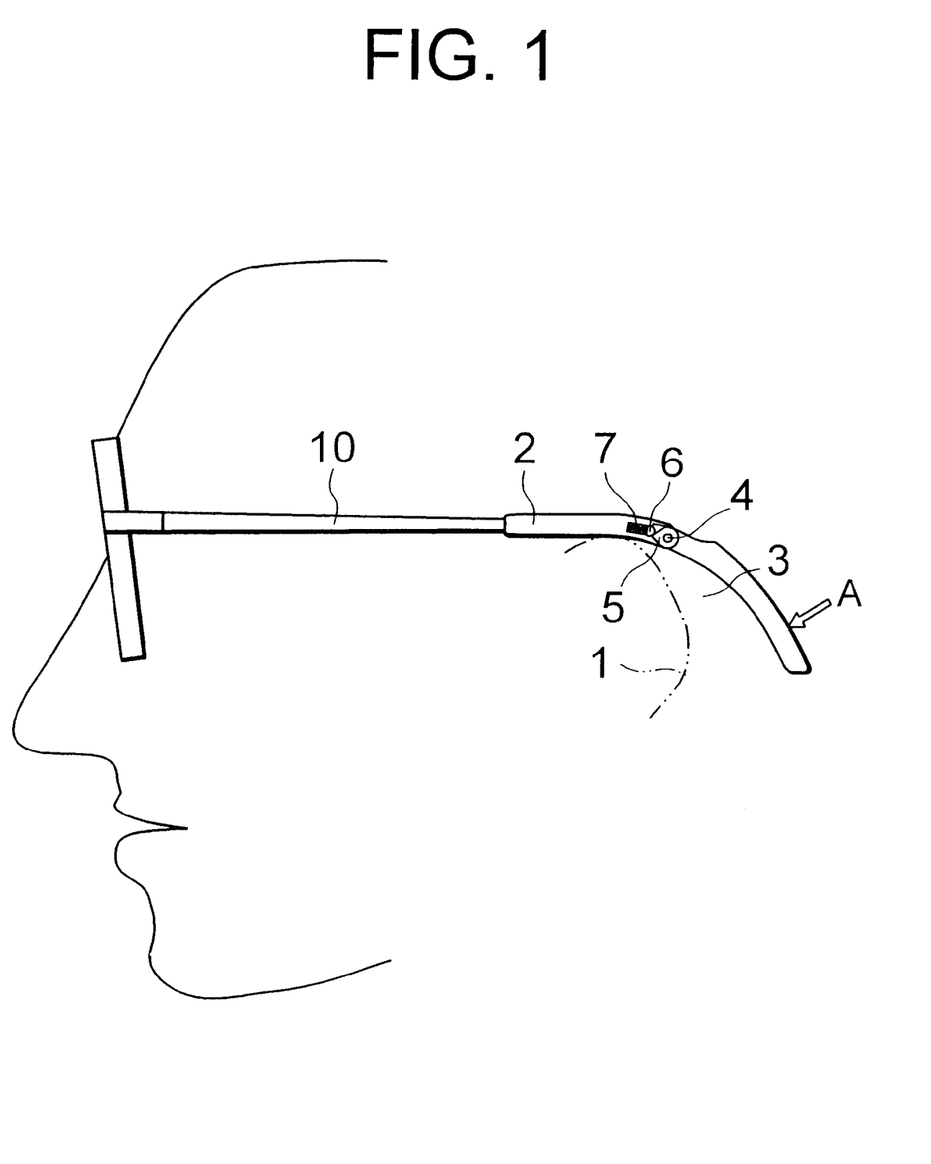
FIG. 1 is a side view for showing a case in which a spectacle frame according to a first embodiment of the present invention is worn.
Figure 2:
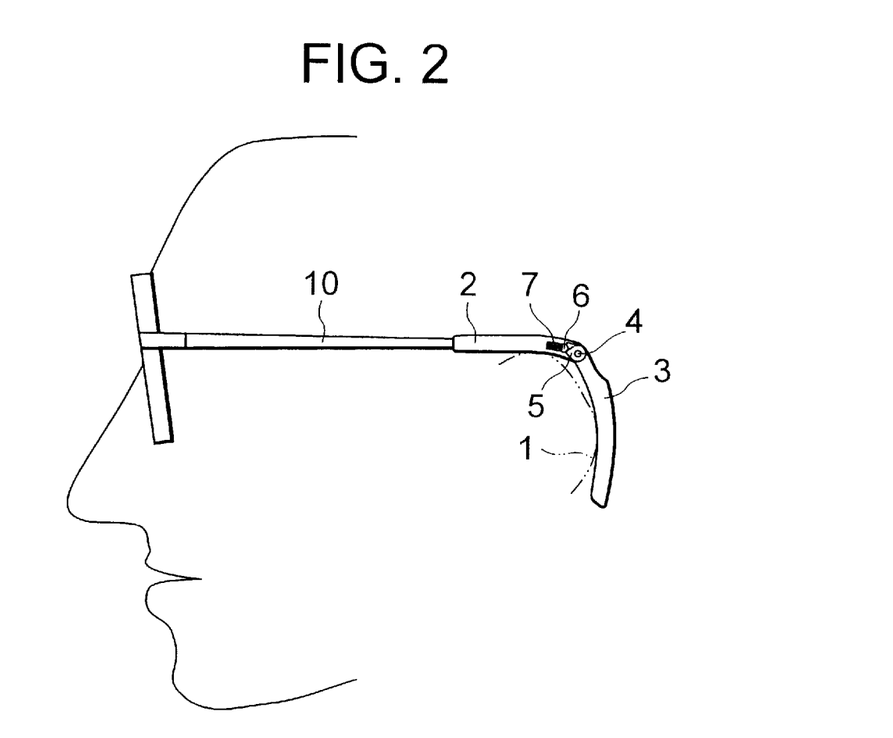
FIG. 2 is a side view for showing a case in which the spectacle frame in the second state is worn.

An example of a spectacle frame of the present invention in a worn state will be described with reference to FIGS. 1 and 2. FIG. 1 is a view of a wearer who wears the spectacle frame in the second state, seen from the side thereof. In this drawing, a temple 10 is connected to a front member 2, and the front member 2 is connected to a back member 3 through a connecting member 4. In the second state shown in FIG. 1, though the front member 2 is mounted on the ear 1 of the wearer, the back member 3 is not in contact with the back of the ear 1 and does not press the ear. Accordingly, in the second state, it is easy to put on and off the spectacle frame in the second state, in the same manner as a conventional spectacle frame which is provided with ear bends of the skull temple type.

The back member 3 can be rotated around the connecting member 4 serving as the center of rotation. FIG. 2 shows a case in which the back member 3 is pressed in the direction of arrow A to obtain the first state. In the first state, the front member 2 is mounted on the ear 1 and the back of the ear 1 is in contact with the back member 3 to press it. For this reason, in the first state, the spectacle does not easily slip off or down even in vigorous activities such as a sport.

In general, a spectacle frame is mainly composed of (1) a front and (2) a bilateral pair of temples each attached to the front via a hinge. A material used for an ear bend includes acetate, propionate, nylon, polyester, or the like.

The present invention will be specifically described below by way of preferred embodiments. However, the present invention is not limited to these embodiments.

[First Embodiment]

Figure 3:
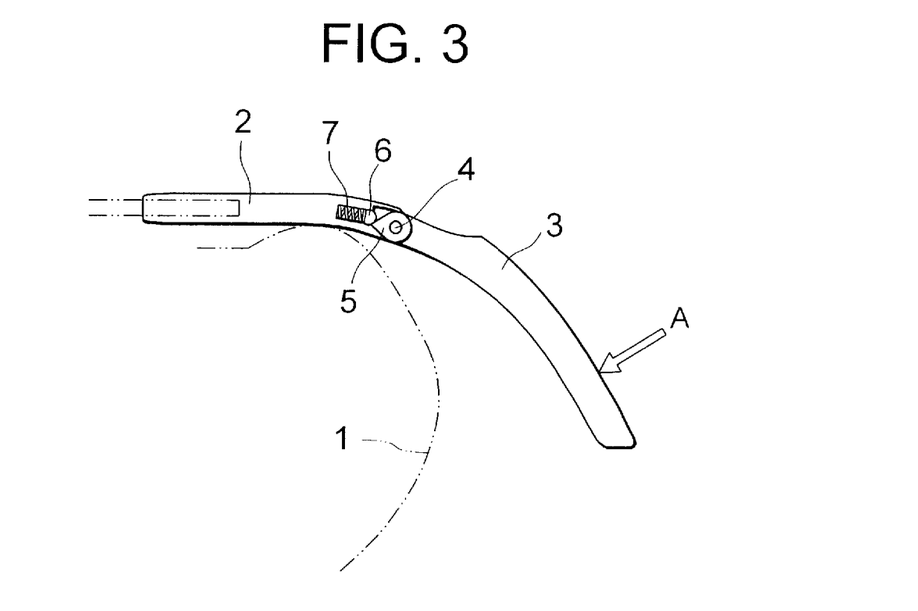
FIG. 3 is a side view for showing an ear bend according to the first embodiment.

FIGS. 1 and 2 and FIGS. 3 to 9 show the same spectacle frame, in which FIG. 3 shows a view of an ear bend seen from the side of the left ear. In FIG. 3, the front member 2 and the back member 3 are connected to each other via the connecting member 4. The constituent parts other than the ear bend are the same as those of a conventional spectacle frame, and description thereof will be omitted.

Figure 4A:
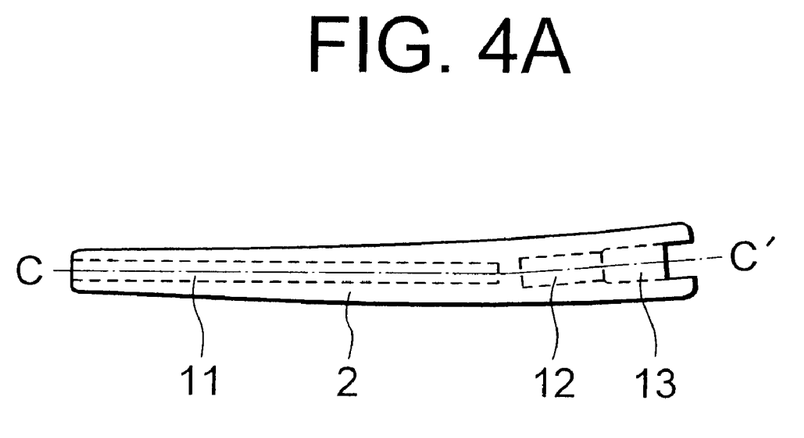
FIG. 4A is a top view thereof and FIG. 4B is a cross-sectional view taken along line C–C', respectively.
Figure 4B:
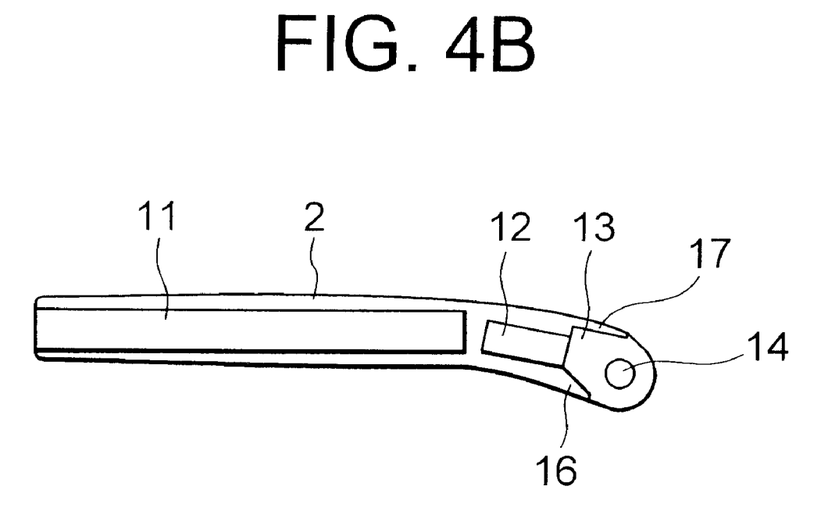

FIGS. 4A and 4B are views for showing the front member 2, in which FIG. 4A is a top view thereof and FIG. 4B is a cross-sectional view taking along line C–C' in the top view in FIG. 4A. An elongated hole 11 is formed on the temple side of the front member 2 for attaching a metallic temple, while an elongated hole 12 is formed on the side connected to the back member for incorporating a spring therein. At the mouth of the elongated hole 12, there is formed an opening 13 for accommodating a cam 21 of the back member 3. The cam 21 has the form of an approximate isosceles triangle, and the vertex of the triangle is rounded.

Figure 5A:
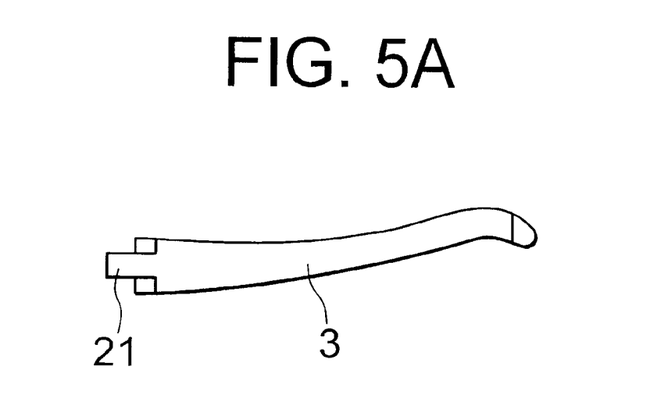
FIG. 5A is a top view thereof and FIG. 5B is a cross-sectional view taken along line C–C', respectively.
Figure 5B:
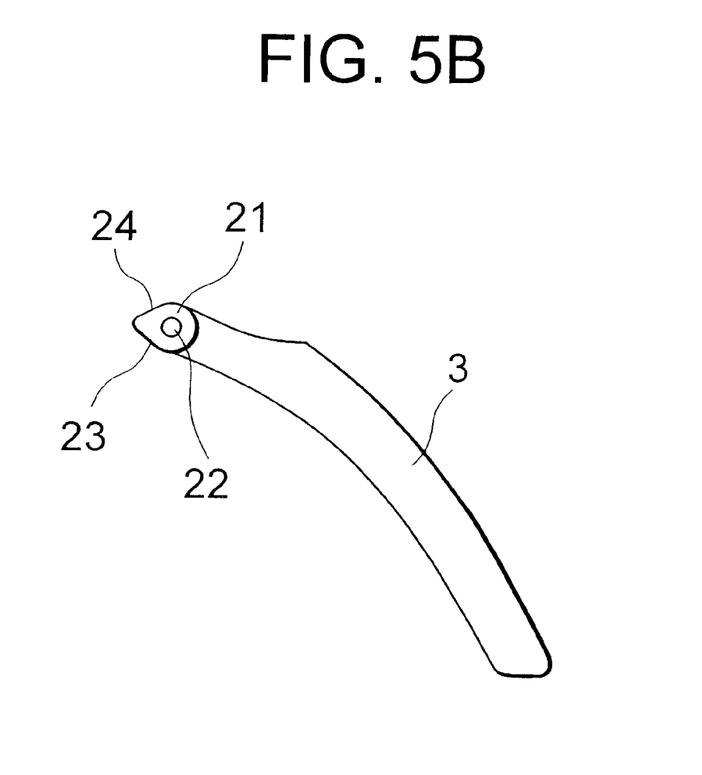

FIGS. 5A and 5B are views for showing the back member 3, in which FIG. 5A is a top view and FIG. 5B is a side view thereof, respectively. The back member 3 has a hole 22 for mounting the cam 21 and a pin 4 (a kind of a connecting member) on the side connected to the front member 2.

A coil spring 7 is received in the elongated hole 12 of the front member 2, and a ball 6 is placed at the back end of the coil spring 7. The cam 21 of the back member 3 is inserted into the opening 13 of the front member 2, whereby the vertex of the cam 21 and the ball 6 are brought into contact with each other. However, since the ball 6 is actually biased toward the cam 21 by the spring 7, the contact condition between the vertex of the cam 21 and the ball is unstable. As a result, the ball 6 is brought into contact with either one of the two oblique sides of the cam 21 (isosceles triangle) to be stabilized.

When the hole 14 of the front member 2 meets the hole 22 of the back member 3, a pin 4 (a kind of a connecting member) is inserted therethrough from the side to connect the both members, thereby obtaining an ear bend shown in FIG. 3. The back member 3 is rotatable around the pin 4 serving as the center of rotation.

Figure 6:
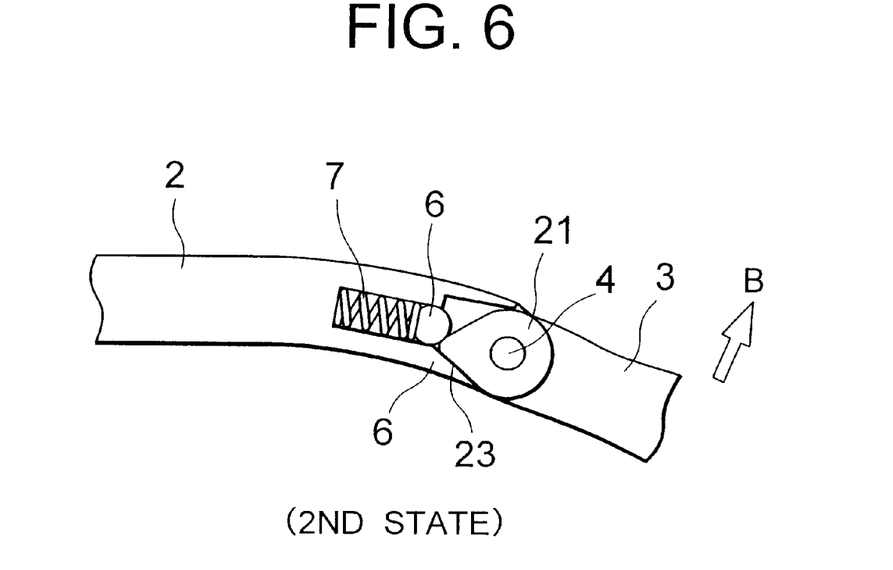
FIG. 6 is an enlarged side view of a connection portion between the front member and the back member according to the first embodiment (in the second state in which the spectacle frame is easily put on and off).

FIG. 6 shows a cross section of the connection portion in an enlarged manner (the second state). The ball 6 is in contact with an oblique side of the cam 21 and is pressed by the coil spring 7, so that the cam 21 is pressed downward. For this reason, the back member 3 is rotated around the pin 4 as the center of rotation in the direction of the arrow B (that is, the back member springs up and is not in contact with the back of the ear). However, the other oblique side 23 of the cam 21 is in due time brought into contact with a wall surface 16 which is disposed below the opening 13 of the front member 2, thereby stopping the rotation of the back member 3.

In this second state, only the front member 2 is mounted on the ear 1, and the back member 3 is not in contact with the back of the ear 1. For this reason, it is easy to put off or on the spectacle, like a spectacle with skull-temple type ear bends.

On the other hand, when the wearer is in vigorous activities such as in a sport, or wants to fix the spectacle securely, the back member 3 is pushed by the hand in the direction A which is reverse to the direction B indicated by the arrow in FIG. 6, whereby the back member 3 is rotated around the pin 4. Consequently, the cam 21 is rotated clockwise on the sheet surface of FIG. 6. For this reason, the state moves to a state shown in FIG. 7. In the state shown in FIG. 7, the ball 6 is brought into contact with the vertex of the cam 21 and is unstable.

Figure 8:
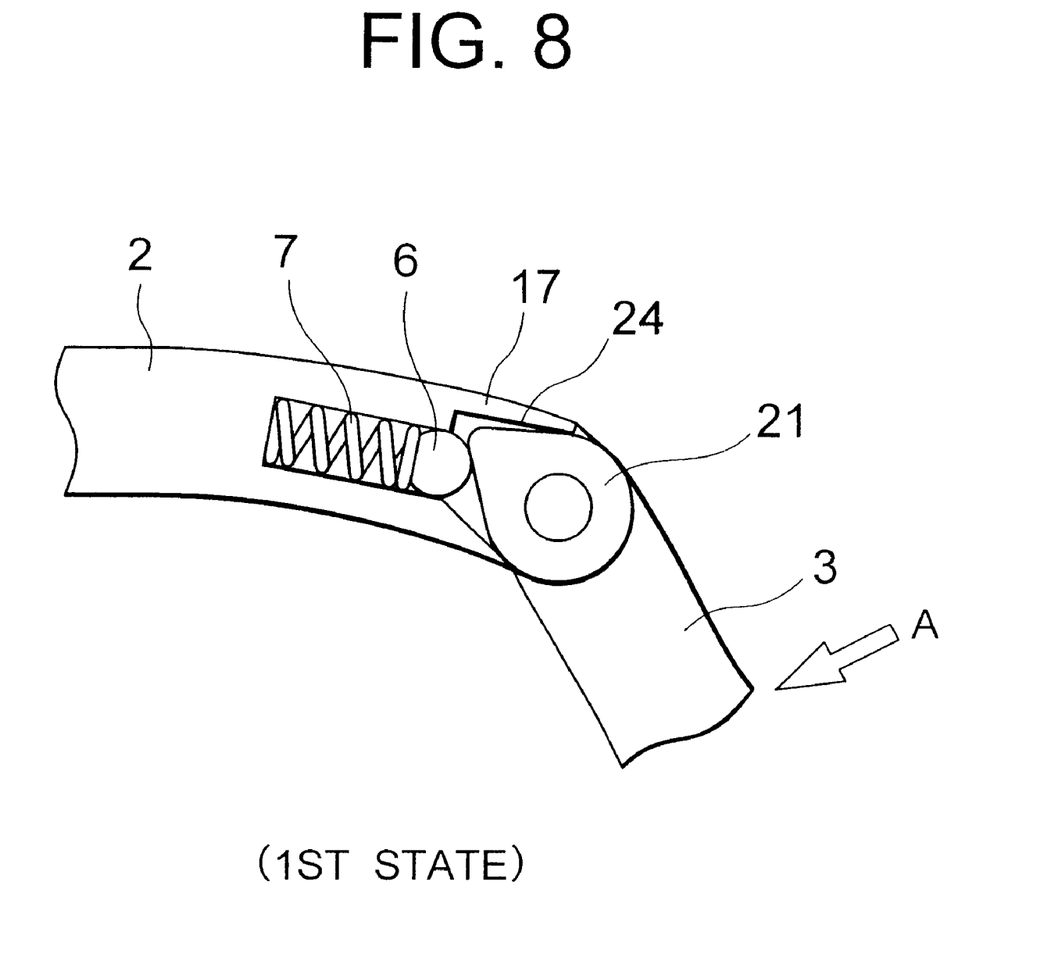
FIG. 8 is an enlarged side view of the connection portion between the front member and the back member according to the first embodiment (in the stable first state).

Furthermore, when the back member 3 is pushed in the direction A, a state shown in FIG. 8 is obtained. The ball 8 is brought into contact with the other oblique side of the cam 21 so as to give pressure to the oblique side clockwise by means of the force of the coil spring 7 on the sheet surface of FIG. 8. For this reason, the back member 3 tends to be rotated in the direction A indicated by the arrow in FIGS. 8 and 9, whereby the back member 3 presses the back of the ear.

On the ear bend in this first state, the front member 2 is mounted on the ear and, at the same time, the back member 3 presses the back of the ear, whereby the spectacle frame hardly slips off.

However, the rotation of the back member 3 (in the direction A indicated by the arrow in FIG. 9) is stopped when the oblique side 24 of the cam 21 is brought into contact with the wall surface 17 above the opening 13. In the stopped state, the pressing against the ear is stopped, naturally.

Figure 7:
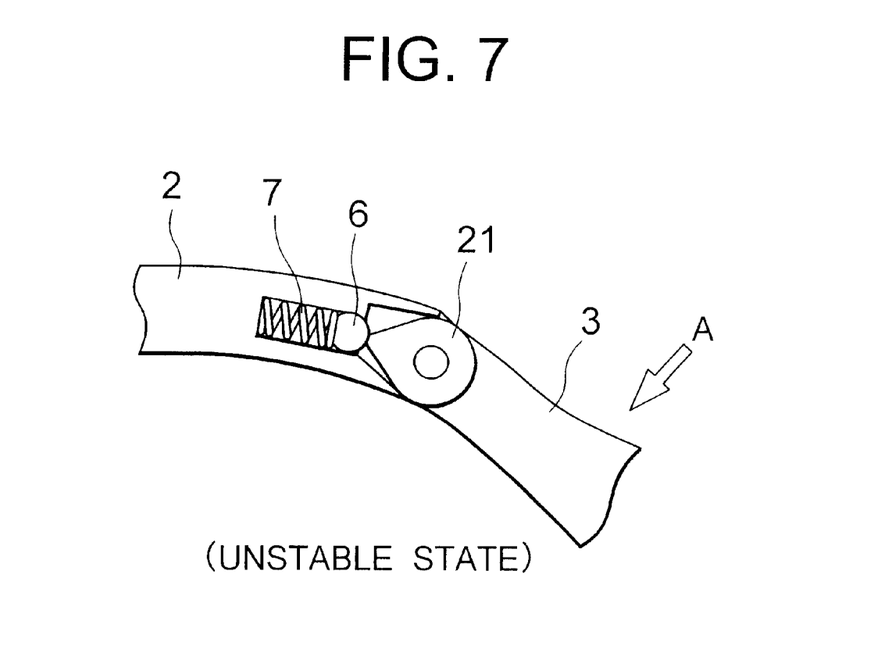
FIG. 7 is an enlarged side view of the connection portion between the front member and the back member according to the first embodiment (in an unstable state).
Figure 9:
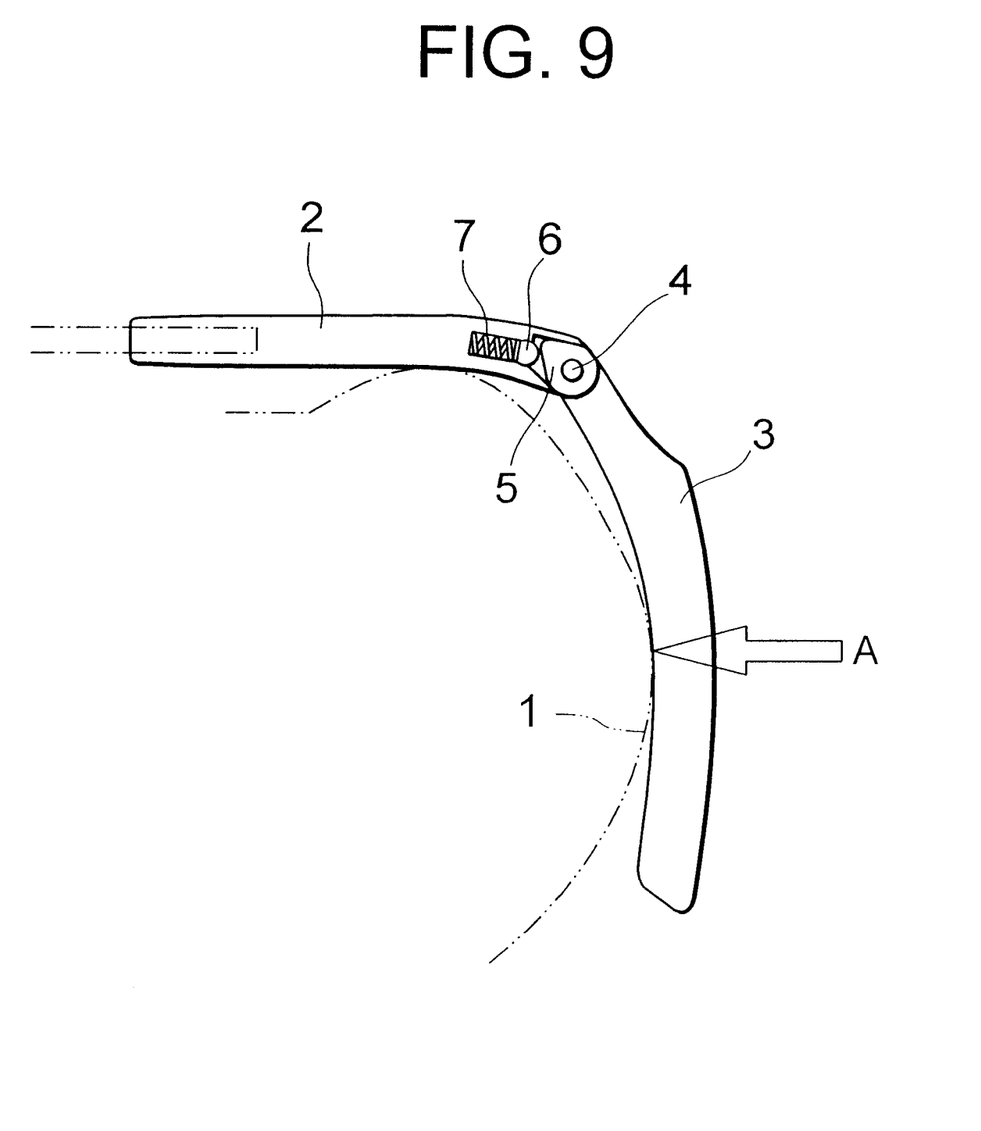
FIG. 9 is a side view for showing the ear bend according to the first embodiment in the stable state.

Also, when the spectacle frame is to be put on or off, the back member 3 is pushed in the direction B opposite to the direction indicated by the arrow in FIG. 9, whereby he back member 3 is rotated around the pin 4 to be returned into the state in FIG. 6 (the second state) through the unstable state of FIG. 7.

Thus, it is possible, in one spectacle frame, to change with one touch the first state in which the spectacle frame is stable against a slip due to a sport, vibration, or perspiration with the second state in which the spectacle frame is easily put on or off.

In the present embodiment, description was made on the case in which ball 6 and the cam 21 were used. However, the ball 6 may take a long and slender spherical form such as an ellipse. Also, the cam 21 of the back member 3 may not be formed as a mere isosceles triangle, but may have a recess which can receive a part of the ball at the vertex thereof. When a part of the ball is received in the recess, the unstable state shown in FIG. 7 becomes a quasistable state.

[Second Embodiment]

Figure 10A:
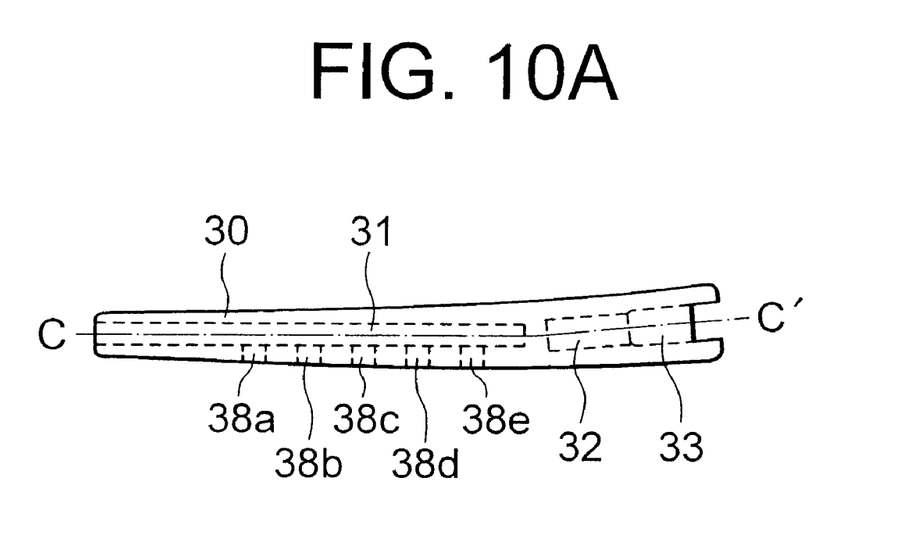
FIG. 10A is a top view thereof and FIG. 10B is a cross-sectional view taken along line C–C', respectively.
Figure 10B:
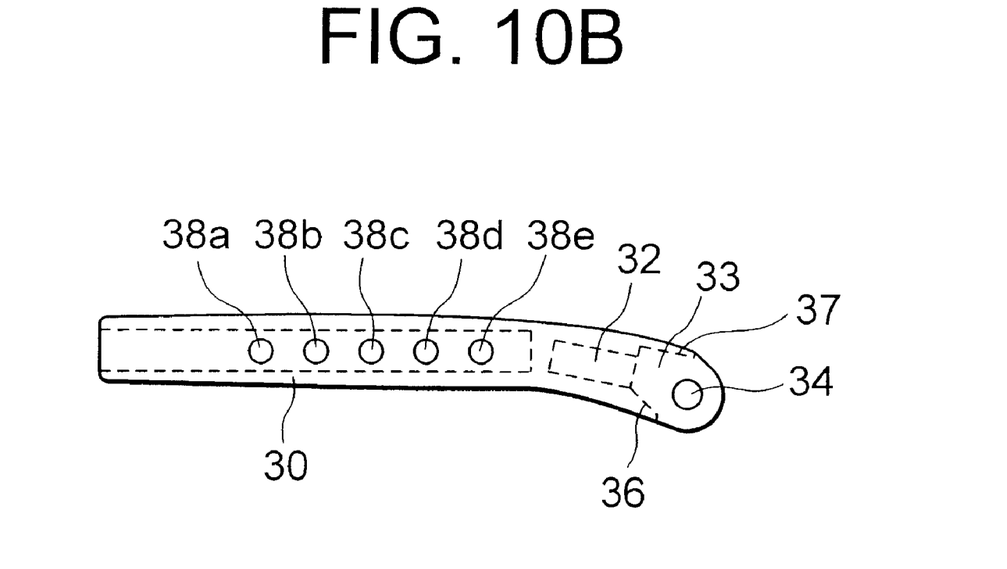

Here, description will be made on a spectacle frame which is obtained by additionally providing a mechanism for adjusting the length of a temple on the spectacle frame of the first embodiment. FIGS. 10A and 10B are views for showing a front member 30 of the second embodiment, in which FIG. 10A is a top view thereof, and FIG. 10B is a cross-sectional view taken along line C–C' in FIG. 10A. The front member 30 is provided with an elongated hole 31 in which the back end portion of the temple is fitted. A plurality of small holes (38a to 38e) are provided at predetermined intervals on the side opposite to the side of front member 30 in contact with the head of the wearer.

Figure 11A:
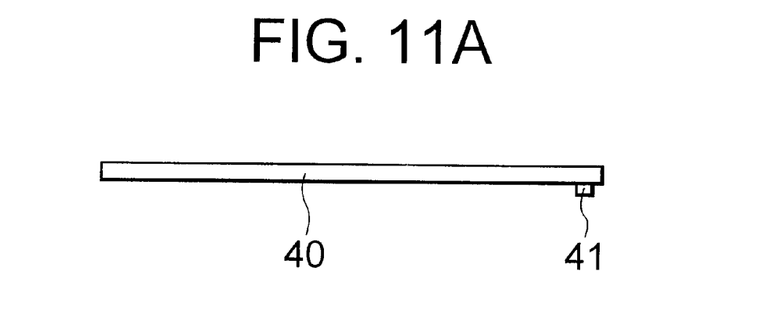
FIG. 11A is a top view thereof and FIG. 11B is a cross-sectional view taken along line C–C', respectively.
Figure 11B:
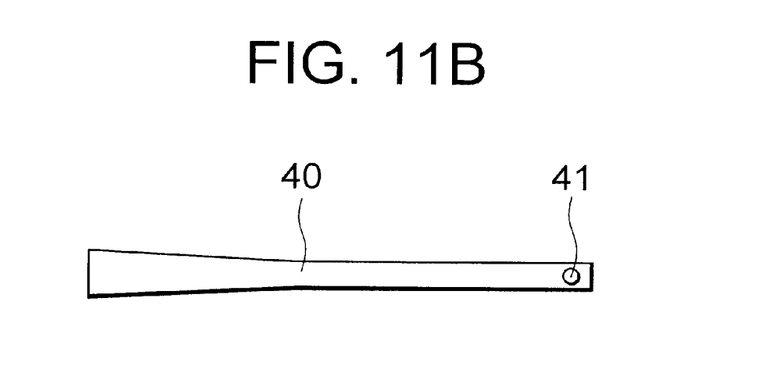

FIGS. 11A and 11B are views for showing the temple 40 of the present invention. A projection 41 is provided on the side of the back end portion of the temple 40 opposite to the side in contact with the head of the wearer. The front member 30 which is formed of thermo-softening plastics is heated and softened in advance, and the back end portion of the temple 40 is fitted in the hole 31 of the front member 30.

In spite of provision of the projection 41, the diameters of the small holes are enlarged since the front member 30 is soft, and the projection 41 advances inward. Then, the projection 41 is made to meet any of the small holes 38a to 38e. In this case, the length from the front end of the temple to the front member can be adjusted in accordance with the position of the small hole. After that, the front member 30 is cooled to a room temperature to be hardened, so that the temple can be securely coupled to the front member 30. Once the both members are coupled, if the front member 30 is heated for the second time, the projection 41 can be moved to meet another small hole. Note that the structure for connecting the front member 30 to the back member is the same as that of the first embodiment, and the back member is also the same as that of the first embodiment.

The spectacle frame of the second embodiment has the function of adjusting the length of the temple, in addition to the function capable of changing the first state in which the spectacle frame is stable against a slip due to a sport, vibration, or sweat with the second state in which the spectacle frame is easily put on or off, with one touch.

[Third Embodiment]

Figure 12:
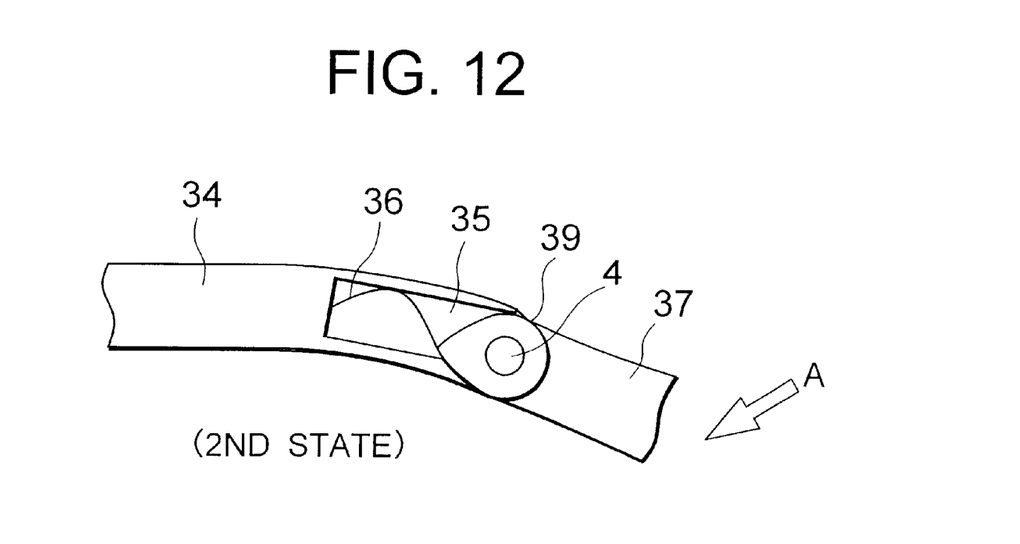
FIG. 12 is an enlarged side view of a connection portion between the front member and the back member according to a third embodiment of the present invention (in the second state in which the spectacle frame is easily put on and off).

Description will be made on a spectacle frame which employs a leaf spring as the selective pressing means. FIG. 12 is an enlarged side view for showing a connection portion between the front member and the back member in the second state in which the spectacle frame can be easily put on or off. The front member 34 is provided with an elongated hole 35 on the side in connection with the back member, in the same manner as the front member of the first embodiment. A leaf spring 36 is attached to the elongated hole 35.

The front end of the leaf spring 36 is attached to the front end of the elongated hole 35, and the back end of the leaf spring 36 is attached to the vertex of the cam 39 of the back member 37. In this state, the back member 37 is sprung up by a spring force of the leaf spring, so that the front member 34 is merely mounted on the ear of the wearer and the back member applies no pressure onto the back of the ear.

When the back member 37 is pushed in the direction A indicated by the arrow, the back member 37 is rotated around the pin 4 serving as the center of rotation. The leaf spring 36 is passed through the unstable state shown in FIG. 13, and then becomes the stable first state shown in FIG. 14. In the first state, like in the first state of the first embodiment, the back member presses the back of the ear so that the spectacle frame hardly slip off.

When the spectacle frame is to be put on or off, the back member 37 is pushed in the direction B opposite to the direction indicated by the arrow so as to change into the second state (FIG. 12) in which the spectacle frame is easily put on or off, with one touch.

Figure 13:
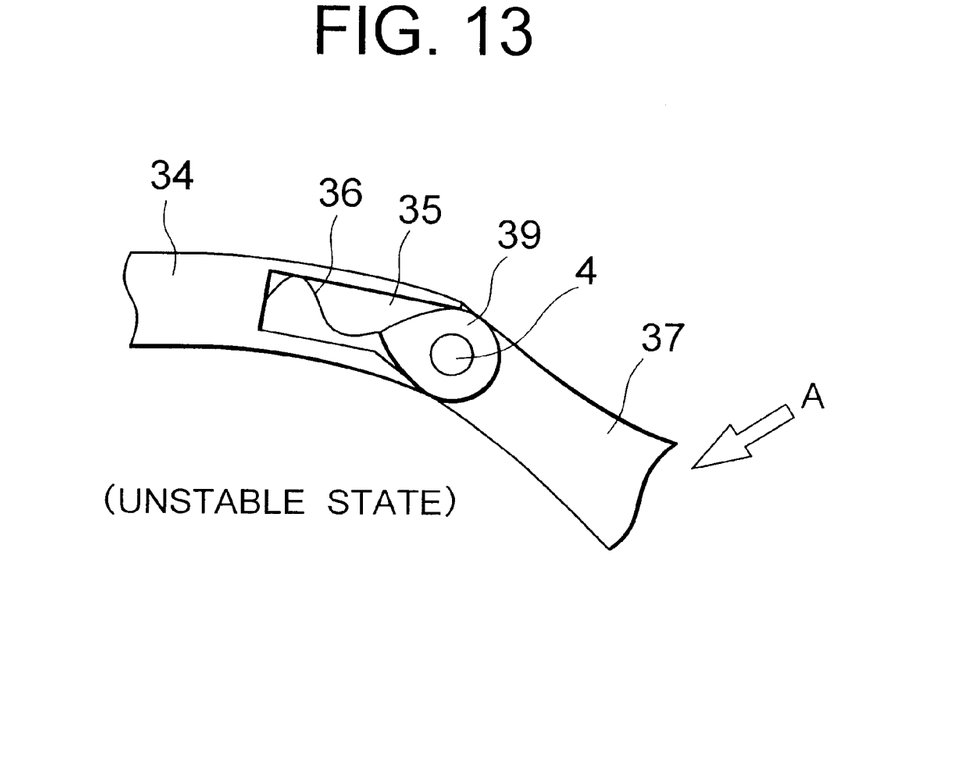
FIG. 13 is an enlarged side view of the connection portion between the front member and the back member according to the third embodiment (in an unstable state).
Figure 14:
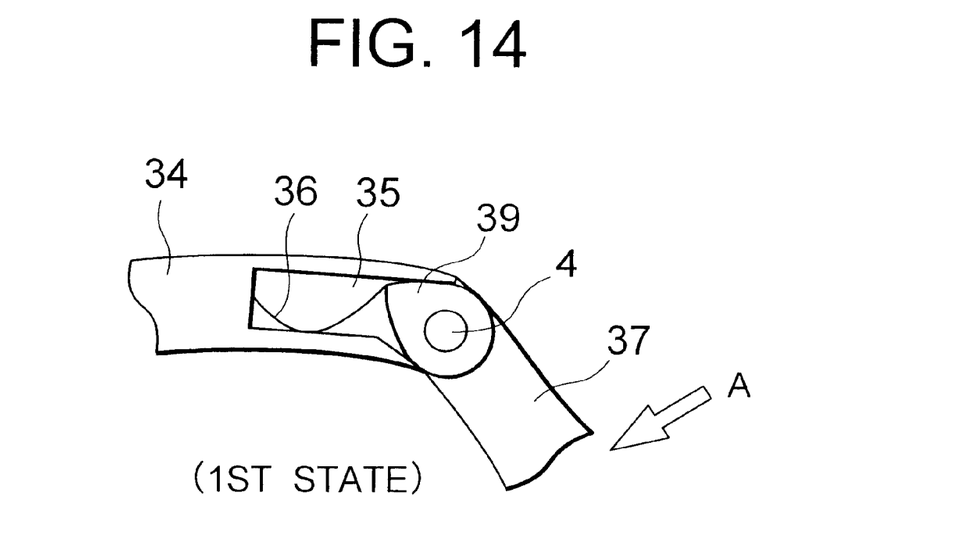
FIG. 14 is an enlarged side view of the connection portion between the front member and the back member according to the third embodiment (in the stable first state).

In addition, it is possible to arrange the selective pressing means by disposing a permanent magnet at the vertex of the cam shown in FIG. 13, instead of using the leaf spring 36, and by providing permanent magnets also on the wall surfaces above and below the elongated hole 35, respectively, so as to utilize the magnetism of the magnets.

[Fourth Embodiment]

Figure 15:
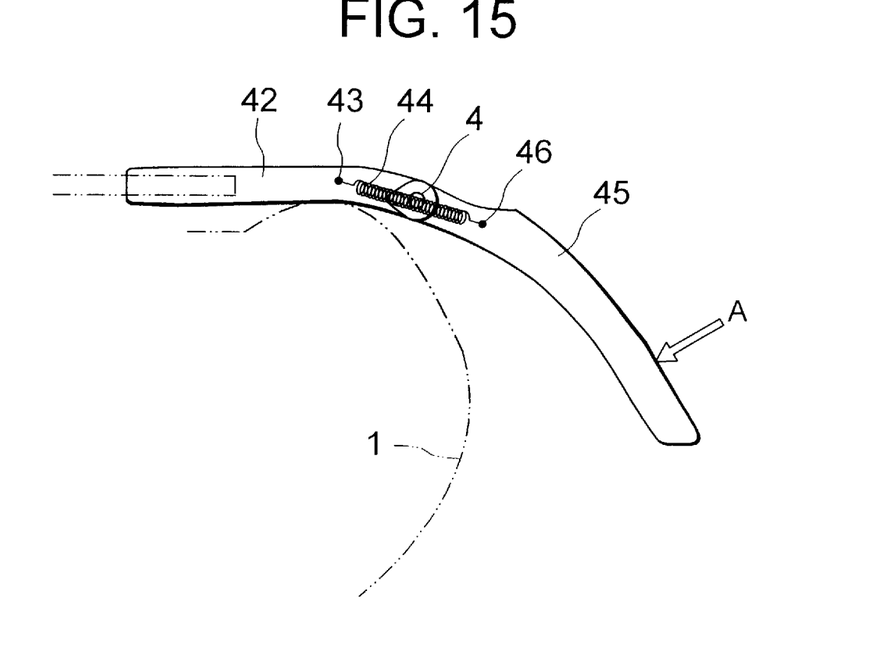
FIG. 15 is an enlarged side view of a connection portion between the front member and the back member according to a fourth embodiment (in the second state in which the spectacle frame is easily put on and off).

Description will be made on a spectacle frame which employs a coiled spring (tension spring) as the selective pressing means. FIG. 15 is a side view for showing a connection portion between the front member and the back member in the second state in which the spectacle frame is easily put on or off. The front member 42 has a projection 43 for attaching the front end of the coiled spring 44 on the outer side thereof. The front end of the coiled spring 44 is hooked by this projection, whereby the coiled spring 44 is attached to the front member 42. On the other hand, the back member 45 also has a projection 46 for attaching the coiled spring on the outer side thereof, in the same manner as the front member. When the back end of the coiled spring 44 is hooked by this projection, the coiled spring 44 is attached to the back member 45.

Figure 16:
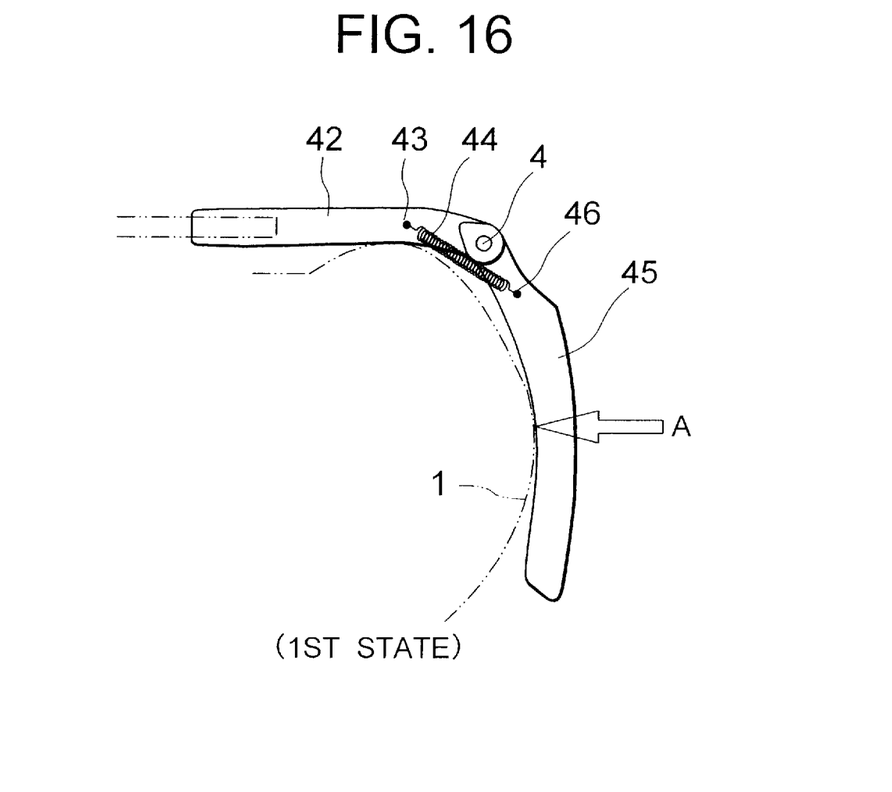
FIG. 16 is an enlarged side view of the connection portion between the front member and the back member according to the fourth embodiment (in the stable first state).

When the back member 45 is pushed in the direction A indicated by the arrow in FIG. 15, the back member is rotated in the direction indicated by the arrow around the pin 4 serving as the center of rotation, so as to obtain the first state shown in FIG. 16. In FIG. 16, since the spring 46 is about to contract, the back member 45 presses the back of the ear, so that the spectacle frame is difficult to slip off.

Furthermore, the back member 45 in the first state (FIG. 16) is pushed in the direction B opposite to the direction indicated by the arrow A to be switched over into the second state (FIG. 15) with one touch. In FIG. 15, the spring 44 is about to be positioned on the upper side of the pin 4 and the spring 44 is about to contract, so that the back member 45 continues to be rotated in the direction B.

As described above, in the spectacle frame of the present invention, it is possible for the wearer with one touch to change (1) the first state in which the wearer can obtain a comfortable feeling in the worn state even in vigorous activities with (2) the second state in which the spectacle frame can be easily put on and off. As a result, it is no longer required for the wearer to prepare two spectacle frames to select one of them for a general use and for vigorous activities, such as sports.

What is claimed is:

1. A spectacle frame with ear bends each comprising an auricular front member connected to a temple, an auricular back member, a connecting member that connects said front member and said back member rotatably, and a mechanism having first and second stable states at opposite sides of an unstable or quasi-stable state, said first stable state being a state in which said back member is near the back of an ear, and said second stable state being a state in which said back member is remote from the back of the ear, said mechanism being operable between said first and second stable states by rotation of said back member with respect to said front member, and wherein said mechanism includes a device that biases said back member toward the back of the ear in said first stable state and that biases said back member away from the back of the ear in said second stable state.

2. A spectacle frame according to claim 1, wherein said device comprises a spring.

3. A spectacle frame according to claim 1, wherein said device comprises a coil compression spring.

4. A spectacle frame according to claim 1, wherein said device comprises a coil tension spring.

5. A spectacle frame according to claim 1, wherein said device comprises a leaf spring.

6. A spectacle frame according to claim 1, wherein said device comprises a cam rotatable with said back member and having a pair of surfaces converging to a vertex, and said front member has a pair of surfaces engagable with respective surfaces of the cam in said first stable state and said second stable state, respectively.

7. A spectacle frame according to claim 6, wherein said surfaces of said cam are side surfaces, respectively, of an isosceles triangle.

8. A spectacle frame according to claim 6, wherein said device comprises a coil compression spring in a bore in said front member and a contact part urged by said coil compression spring into engagement with one or the other of the surfaces of the cam in the first stable state or the second stable state, respectively, and into engagement with the vertex of the cam in the unstable or quasi-stable state.

9. A spectacle frame according to claim 1, wherein said device comprises a part rotatable with said back member and having a pair of surfaces converging to a vertex, and a leaf spring in a bore in said front member connected to the vertex of said part, and wherein said front member has a pair of surfaces engagable with respective surfaces of the part in said first stable state and said second stable state, respectively.

10. A spectacle frame according to claim 1, wherein said device comprises a part rotatable with said back member and having a pair of surfaces converging to a vertex, and a coil tension spring connected between said front member and said back member, and wherein said front member has a pair of surfaces engagable with respective surfaces of said part in said first stable state and said second stable state, respectively.

11. A spectacle frame according to claim 1, further comprising an adjustment mechanism for adjusting a position of connection between the temple and said front member so that the length from the front end of the temple to the back end of the front member is adjustable.

12. A spectacle frame according to claim 1, wherein said first stable state is a state in which said back member presses against the back of the ear, and wherein said device biases said back member to press against the back of the ear in said first stable state.

13. A spectacle frame with ear bends each comprising an auricular front member connected to a temple, an auricular back member, and a connecting member that connects said front member and said back member rotatably, said back member being rotatable with respect to said front member between a first position in which said back member is near the back of an ear and a second position in which the back member is remote from the back of the ear, and further comprising a device that biases said back member toward said second position when a wearer of the spectacle frame rotates said back member from the first position past a position intermediate said first and second positions, and that biases said back member toward the first position when the wearer rotates said back member from said second position past a position intermediate said first and second positions.

14. A spectacle frame according to claim 13, wherein said device comprises a spring.

15. A spectacle frame according to claim 13, wherein said device comprises a coil compression spring.

16. A spectacle frame according to claim 13, wherein said device comprises a coil tension spring.

17. A spectacle frame according to claim 13, wherein said device comprises a leaf spring.

18. A spectacle frame according to claim 13, wherein said device comprises a cam rotatable with said back member and having a pair of surfaces converging to a vertex, and said front member has a pair Of surfaces engagable with respective surfaces Of the cam in said first position and said second position, respectively, of said back member.

19. A spectacle frame according to claim 18, wherein said surface s of said cam are side surfaces, respectively, of an isosceles triangle.

20. A spectacle frame according to claim 18, wherein said device comprises a coil compression spring in a bore in said front member and a contact part urged by said coil compression spring into engagement with one or the other of the surfaces of the cam in the first position or the second position, respectively, and into engagement with the vertex of the cam in an intermediate position of the back member.

21. A spectacle frame according to claim 13, wherein said device comprises a part rotatable with said back member and having a pair of surfaces converging to a vertex, and a leaf spring in a bore in said front member connected to the vertex of said part, and wherein said front member has a pair of surfaces engagable with respective surfaces of the part in said first position and said second position, respectively, of said back member.

22. A spectacle frame according to claim 13, wherein said device comprises a part rotatable with said back member and having a pair of surfaces converging to a vertex, and a coil tension spring connected between said front member and said back member, and wherein said front member has a pair of surfaces engagable with respective surfaces of said part in said first position and said second position, respectively, of said back member.

23. A spectacle frame according to claim 13, further comprising an adjustment mechanism for adjusting a position of connection between the temple and said front member so that the length from the front end of the temple to the back end of the front member is adjustable.

* * * * *